United States Patent

[11] 3,571,577

[72] Inventors Kikuo Kubo;
Takafumi Kumagai, Tokyo, Japan
[21] Appl. No. 698,450
[22] Filed Jan. 17, 1968
[45] Patented Mar. 23, 1971
[73] Assignee Nippon Columbia Company, Limited
Tokyo, Japan
[32] Priority Jan. 25, 1967
[33] Japan
[31] 42/5167

[54] NUMERICAL DISPLAY SYSTEM
5 Claims, 4 Drawing Figs.
[52] U.S. Cl. ................................................. 235/92,
340/378
[51] Int. Cl. ................................................. G09f 9/00
[50] Field of Search .......................................... 235/92, 6,
65, 60, 68, 73; 340/378

[56] References Cited
UNITED STATES PATENTS
3,358,125 12/1967 Rinaldi ....................... 235/92
3,392,270 7/1968 Boucke ....................... 235/92

Primary Examiner—Maynard R. Wilbur
Assistant Examiner—Joseph M. Thesz, Jr.
Attorney—Hill, Sherman, Meroni, Gross & Simpson ABSTRACT: A numerical display system characterized in that a plurality of numerical indicators are sequentially and serially driven from the least significant one to the most significant one in synchronism with the sequential period of a register including a plurality of digit portions in which numerical contents to be displayed are stored and digit sequentially taken out therefrom by way of right shift, and the contents of said register are displayed with invalid zero or zeros prevented from being indicated.

NUMERICAL DISPLAY SYSTEM

This invention relates to a numerical display system capable of producing plural-digit numerical display without invalid or unnecessary zero or zeros by the use of numerical indicators.

In accordance with an important aspect of the present invention a plurality of numerical indicators are sequentially and serially driven by the use of a logic circuit which is common to all the numerical indicators, and in synchronism with the sequential and serial driving of the numerical indicators, detection is made of whether zero to be indicated on any of the numerical indicators is invalid zero, so that such invalid zero is prevented from being indicated on any of the numerical indicators.

The inventors have already developed a system for producing numerical display without invalid zero or zeros by sequentially and serially driving a plurality of numerical indicators on the basis of the contents of a register. Such system includes a plurality of numerical indicators for indicating a plural-digit number, a register the number of digit portions of which is at least equal to the number of said plural digits wherein numerical contents corresponding to the respective digits are stored in the respective digit portions and digit sequentially taken out therefrom, indicator selecting means for sequentially selecting said plurality of numerical indicators in synchronism with the sequential period of said register, numeral selecting means for selecting those terminals of said plurality of numerical indicators which are adapted to indicate an identical numeral in accordance with the numerical contents sequentially taken out from said register, and zero indication preventing means adapted to detect whether or not zero in the numerical contents sequentially taken out from said register is invalid zero and prevent, when it is invalid zero, the corresponding indicator from indicating such zero, wherein the numeral corresponding to the selected terminal in each numerical indicator sequentially selected by said indicator selecting means is indicated when it is not prevented from being indicated by said zero indication preventing means, thereby producing a plural-digit numerical display without invalid zero or zeros. The register for use with the foregoing system is of left shift type (the register is shifted from the least significant digit to the most significant one). For numerical display per se, it does not matter whether the register is of left shift type or right shift type (the register is shifted from the least significant digit to the most significant one). However, in the cases where a result computed by an electronic computer is to be numerically displayed, the register for use in such computer is ordinarily or right shift type for serial computation. Thus, if the contents of the aforementioned register is to be computed, it is required that such register have two modes of shift, that is, left shift and right shift. Obviously, this makes the entire arrangement complicated and increases the number of circuit elements required.

Accordingly, it is a primary object of this invention to provide a novel numerical display system wherein when the contents of a register is numerically displayed, a plurality of indicators are sequentially and serially driven while the register is being right-shifted, thereby producing a numerical display without any invalid zero.

Another object of this invention is to provide a novel numerical display system capable of being constructed as a simplified circuit arrangement with less power consumption, wherein a plurality of numerical indicators are sequentially and serially driven to produce numerical display without any invalid zero.

Other objects, features and advantages of the present invention will become apparent from the following description taken in conjunction with the accompanying drawings, in which.

The present invention will now be described in greater detail with reference to the drawings.

Figure 1:
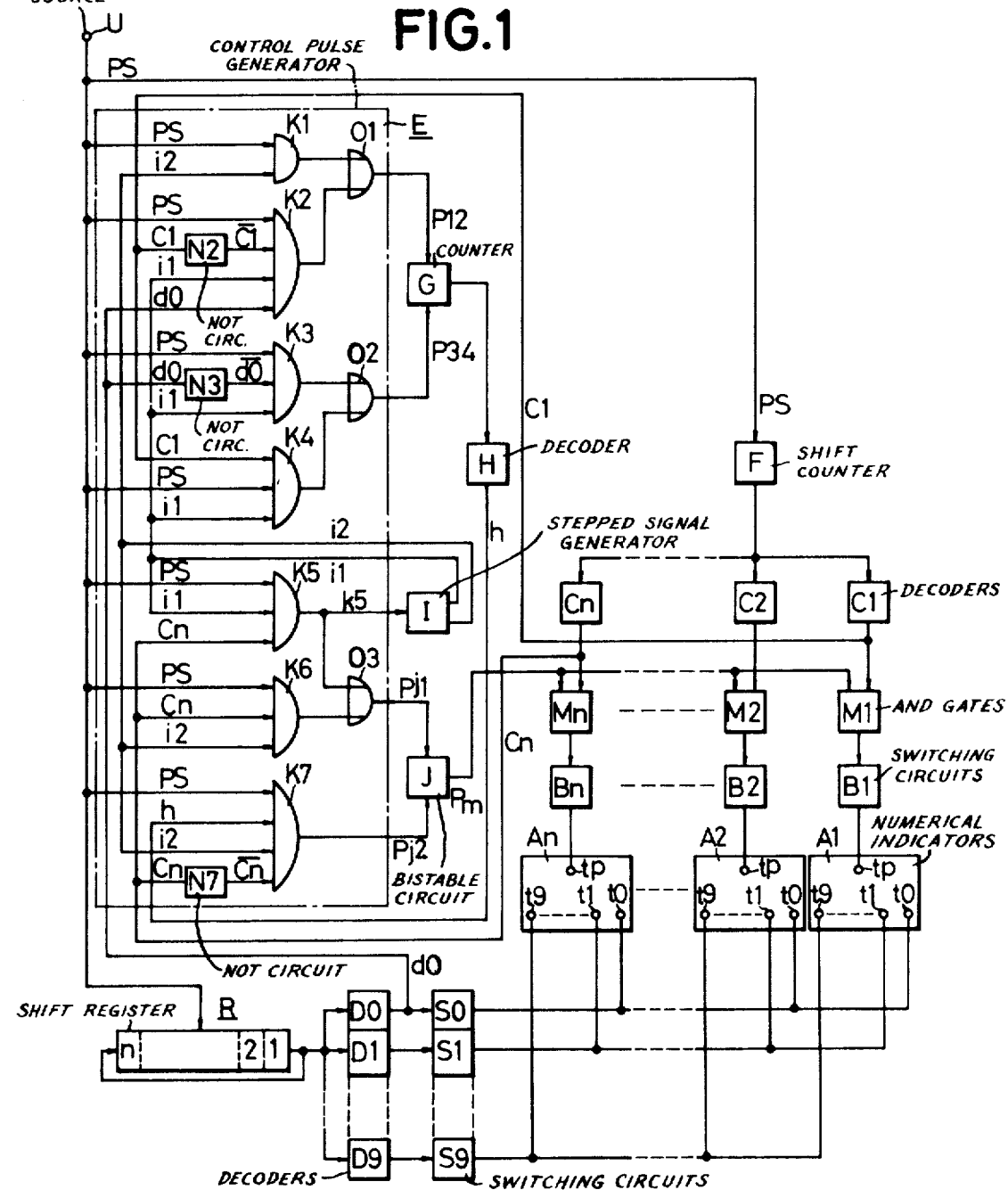
FIG. 1 is a block diagram showing the numerical display system according to an embodiment of this invention which is adapted for producing a numerical display without the decimal point.
Figure 2:
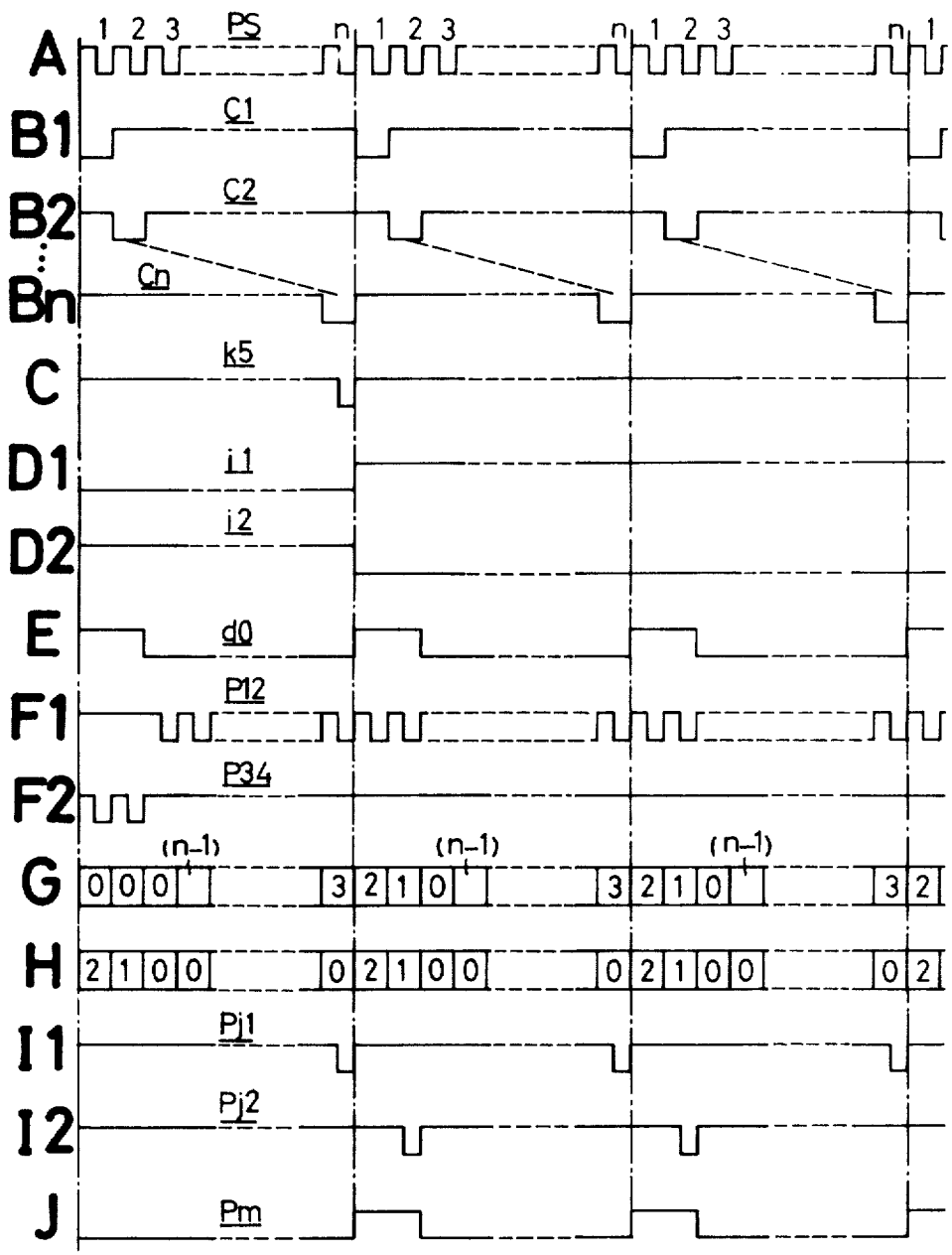
FIG. 2 is a view showing a signal arrangement useful for explaining the system as shown in FIG. 1.

Referring now to FIGS. 1 and 2, description will be made of the case where the decimal point is not indicated. In FIG. 1, A1, A2, ..., A$n$ represent 1st-digit, 2nd-digit, ..., $n$th-digit numerical indicators, respectively. Each of the numerical indicators is provided with terminals $t0$, $t1$, $t2$, ..., $t9$ for indicating the numerals 0, 1, 2, ..., 9 respectively and a terminal $tp$ common to said terminals $t0$, $t1$, $t2$, ..., $t9$. The terminals $t0$, $t1$, $t2$, ..., $t9$ of each indicator are taken out from the numerical electrodes if such indicator is a numerical indicator tube such as for example, Nixie tube, and if it is composed of lamps and numerical panels, each of them is taken out from one electrode of the lamps. The terminal $tp$ is taken out from a common plate electrode if the indicator is a numerical indicator tube, and if it is formed by lamps and numerical panels, such terminal is taken out from the connection of the other electrodes of the lamps.

The terminals $t0$ of the numerical indicators A1—A$n$ are coupled to each other and connected with a switching circuit S0, the terminals $t1$ of the indicators A1—A$n$ are also coupled to each other and connected with a switching circuit S1, ..., the terminals $t9$ of the indicators A1—A$n$ are similarly coupled to each other and connected with a switching circuit S9. The common terminals $tp$ of indicators A1, A2, ..., A$n$ are connected with switching circuits B1, B2, ..., B$n$ respectively.

There is provided a right circulation or right shift type register R the number of digit portions of which corresponds to the number of digits to be indicated by the indicators, wherein a binary-coded decimal contents is stored in each of the digit portion thereof, for example. The register R is supplied with a digit-shift pulse train PS from a shift pulse source U, so that numerical contents to be sequentially displayed are digit sequentially taken out from the register R at every pulse of the shift pulse train PS. In this case, it is to be noted that the register is of right shift type. The digit-sequential numerical contents taken out from the register R are supplied to decoders D0, D1, ..., D9 for decoding the contents 0, 1, ..., 9 to drive the switching circuits S0, S1, ..., S9, respectively.

The shift pulse train P$s$ from the shift pulse source U is supplied to a shift counter F. The counter F is designed so that its contents are changed in synchronism with the digit-shifting operation of the register R to determine the digit order of the output of the register R. The output of the counter F is supplied to decoders C1, C2, ..., C$n$. In this case, design is made such that when a certain digit contents is taken out from the register R, only the decoder corresponding to that digit is enabled to produce an output. For example, only the decoder C1 is enabled to produce an output by the output contents of the counter F when the 1st-digit output contents is taken out from the register R.

Each of the decoders C1, C2 ..., C$n$ is connected with one of the input terminals of each of AND gate circuits M1, M2, ..., M$n$, and the outputs of these AND gate circuits M1, M2, ..., M$n$ are connected with the switching circuits B1, B2, ..., B$n$, respectively. Although the 1st-digit AND gate circuit M1 is not essentially required, description will be made of the case where the gate circuit M1 is provided.

There are also provided a control pulse generator circuit E, a counter G driven by the output of the control pulse generator circuit E, a decoder H adapted to decode the 1 contents of the counter G, a stepped signal generator I constructed in the form of a single input bistable circuit driven by the output of the control pulse generator circuit E, and a double-input bistable circuit J. The control pulse generator circuit E comprises an AND circuit K1 to which are supplied the shift pulse train P$s$ and a second stepped signal $i2$ of the stepped signal generating circuit I, an AND circuit K2 to which are applied the shift pulse train Ps, an output c̄1 obtained by passing the output c1 of the decoder C1 through a NAND circuit N2, a first stepped signal i1 of the stepped signal generating circuit I and the output d0 of the decoder D0, an AND circuit K3 to which are supplied the shift pulse train Ps, an output d̄0 obtained by passing the output d0 of the decoder D0 through a NAND circuit N3 and the first stepped signal i1, an AND circuit K4 to which are supplied the shift pulse train Ps, the output c1 of the decoder C1 and the first stepped signal i1, an AND circuit K5 to which are supplied the shift pulse train Ps, the first stepped signal i1 and the output cn of the decoder Cn, an AND circuit K6 to which are supplied the shift pulse train Ps, the output cn of the decoder Cn and the second stepped signal i2, an AND circuit K7 to which are supplied the shift pulse train Ps, the output h of a decoder H, the second stepped signal i2 and an output c̄n obtained by passing the output cn of the decoder Cn through a NAND circuit N7, an OR circuit 01 to which are supplied the outputs of the AND circuits K1 and K2, an OR circuit 02 to which are supplied the outputs of the AND circuits K3 and K4, and an OR circuit 03 to which are supplied the outputs of the AND circuits K5 and K6. The output of the OR circuit 01 is supplied to the counter G as a −1 instruction signal P12 which subtracts 1 from the contents of the counter G. The output of the OR circuit 02 is supplied to the counter G as a signal P34 which clears the contents of the counter G. The output of the AND circuit K5 is supplied to the stepped signal generating circuit I as a step switching instruction signal K5. The output of the OR circuit 03 is supplied to the bistable circuit J as a set signal Pj1. The output of the AND circuit K7 is supplied to the bistable circuit J as a reset signal Pj2.

The output Pm of the bistable circuit J is supplied to the aforementioned AND gate circuits M1, M2, ..., Mn.

With the foregoing arrangement, in case the output contents of the register R is 0 for example, the decoder D0 is caused to produce the output by which the switching circuit S0 is driven. In case the output contents of the register R is 2 for example, the decoder D2 is caused to produce the output by which the switching circuit S2 is driven. In the same way, that one of the decoders which corresponds to the output contents of the register R is caused to produce the output by which the corresponding one of the switching circuits is driven. The counter F is so designed that its contents becomes 1—2—, ..., —n—1—2—.... at every pulse of the shift pulse train Ps, and it is in synchronism with the register R. Thus, if the contents of the counter F is 1, for example, the decoder C1 is caused to produce the output which is supplied to the AND gate circuit M1. In this way, that one of the decoders which corresponds to the contents of the counter F is caused to produce the output which is supplied to the corresponding one of the AND gate circuits.

In this case, if the bistable circuit J has been set to produce the output, that one of the AND gate circuits M1—Mn which corresponds to that one of the decoders C1—Cn which produces the output is opened so that the corresponding one of the switching circuits B1—Bn is driven. Assume that the last 1st-digit and 2nd-digit contents of the register R are 2 and 1 respectively, that all the remaining digit contents are 0, and that the bistable circuit J has been set to produce the output. Then, during one circulation of the register R, 2 is indicated on the 1st-digit indicator A1, 1 on the 2nd-digit indicator A2, and 0 on the 3rd-digit indicators A3 remaining ones, in the named order at every shift pulse. During the subsequent one circulation of the register R, too, similar operation is effected. In this way, such operation is repeated. In accordance with the present invention, the bistable circuit J is controlled in such a manner as described below, so that 0's in the 3rd-digit and more significant ones, which are invalid zeros, are prevented from being indicated.

The control modes of the bistable circuit J will now be described with respect to the case where the output of the register R is taken out from the least significant or 1st-digit portion thereof, and on the assumption that as in the foregoing example the 1st-digit and 2nd-digit contents of the register R are 2 and 1 respectively and all the remaining digit contents thereof are 0, that is, the contents of the register R are "00.... 12."

The shift pulse train Ps from the shift pulse generating source U is shown in FIG. 2A. The contents of the counter F are changed in such a manner as 1—2—.... n—1—2 every time the shift pulse train Ps arrives thereat. Thus, the decoders C1, C2, ..., Cn are caused to produce the outputs c1, c2, ..., cn as shown at B1, B2, ..., Bn of FIG. 2, with the numerals representing the contents of the counter F given to the pulse train Ps of FIG. 2A. The AND circuit A5 of the control pulse generating circuit E is adapted to achieve the AND function with the aid of the shift pulse train Ps, the first stepped signal i1 from the stepped signal generating circuit I and the output cn of the decode Cn, so that at the time when circulation subsequent to the initial one of the register is about to begin, a step switching pulse k5 such as shown in FIG. 2C is produced which is supplied to the stepped signal generating circuit I which in turn produces the first and second stepped signals i1 and i2 as shown in FIG. 2 D1 and D2. The arrangement of the output contents of the register R is as shown in FIG. 2H, so that the decoder D0 is caused to produce the output except when the contents of the counter F is 1 or 2. Thus, the output d0 as shown in FIG. 2E is obtained.

The AND circuit K2 is supplied with the shift pulse train Ps, the first stepped signal i1, the NOT output c̄1 of the decoder C1 and the decoder output d0 so that it is caused to produce outputs corresponding to the third and sequent pulses of the shift pulse train Ps during the time when the first stepped signal i1 occurs, that is, during the period of the first circulation of the register R and counter F. The AND circuit K1 is supplied with the shift pulse train Ps and the second stepped signal i2, so that a pulse train corresponding to the shift pulse train Ps is obtained during the time when the second stepped signal i2 occurs, that is, during the second and subsequent circulations of the register R and counter F. Thus, a pulse train P12 of which the arrangement is shown at F1 of FIG. 2 is produced which is supplied to the counter G to successively subtract 1 from the contents of the counter G. Furthermore, the AND circuit K3 is supplied with the shift pulse train Ps, the output d̄0 and the first stepped signal i1, and the AND circuit K4 is supplied with the shift pulse train Ps, the first stepped signal i1 and the output C1, so that such pulses P34 as shown at F2 of FIG. 2 are applied to the counter G to clear the contents thereof. (Although, in this example, it may be considered that the AND circuit K4 is unnecessary since the output pulses thereof overlap part of those of the AND circuit K3, it is required to indicate the 1st-digit contents when it is 0 for example).

Thus, during the occurrence of the first stepped signal i1 the contents of the counter G which was initially 0 is changed to n−−1 with the aid of the first pulse of the pulse train P12 when the fourth pulse of the pulse train Ps is obtained, (when the contents of the counter F is changed to 4), and it is changed to n−2 with the aid of the second pulse of the pulse train P12 when the fifth pulse is obtained. In this way, 1 is successively subtracted from the contents of the counter G, and the latter is changed to 2 when the first pulse of the pulse train Ps is obtained upon occurrence of the second stepped signal i2. During the period of the second stepped signal i2, too, the contents of the counter G is similarly subtracted 1 so that the successive counter contents become 2—1—0—n−1 ..... Such operation is repeated.

The AND circuit K6 is supplied with the shift pulse train Ps, the decoder output cn and the second stepped signal i2, and at this time the pulse output k5 of the AND circuit K5 is present, so that the OR circuit 03 is caused to provide a set pulse Pj1 as shown at I1 of FIG. 2, which is supplied to the set side of the bistable circuit J. The AND circuit K7 is supplied with the shift pulse Ps, the decoder output h, the second stepped signal i2 and the NOT output c̄n of the decoder Cn, so that it provides a reset pulse Pj2 as shown at I2 of FIG. 2 when the contents of the counter G becomes 1. The reset pulse $Pj2$ is applied to the reset side of the bistable circuit J. Thus, in the second and subsequent circulations of the register R, the bistable circuit J provides a rectangular wave output $Pm$ which occurs from the start of each of said circulations to the end of the second pulse of the shift pulse train $Ps$, that is, during the time when the contents of the counter F is 2 and 1.

Thus, except when the rectangular wave output $Pm$ occurs, the output of the bistable circuit J is not supplied to the AND gate circuit $M1$—$Mn$, so that the latter are rendered off. In this way 2, 1, 0, ... 0 are to be indicated on the indicators $A1$, $A2$, $A3$, ..., $An$ in accordance with the contents 00 —12 of the register R while the latter is successively shifting to the right. In this case, however, all 0's in the 3rd and more significant digits are prevented from being indicated on the indicators $A3$—$An$. Consequently, it is possible that 2 and 1 are indicated on the indicators $A1$ and $A2$ respectively, while invalid 0's are masked so that they are prevented from being indicated on the remaining indicators $A3$—$An$.

Figure 3:
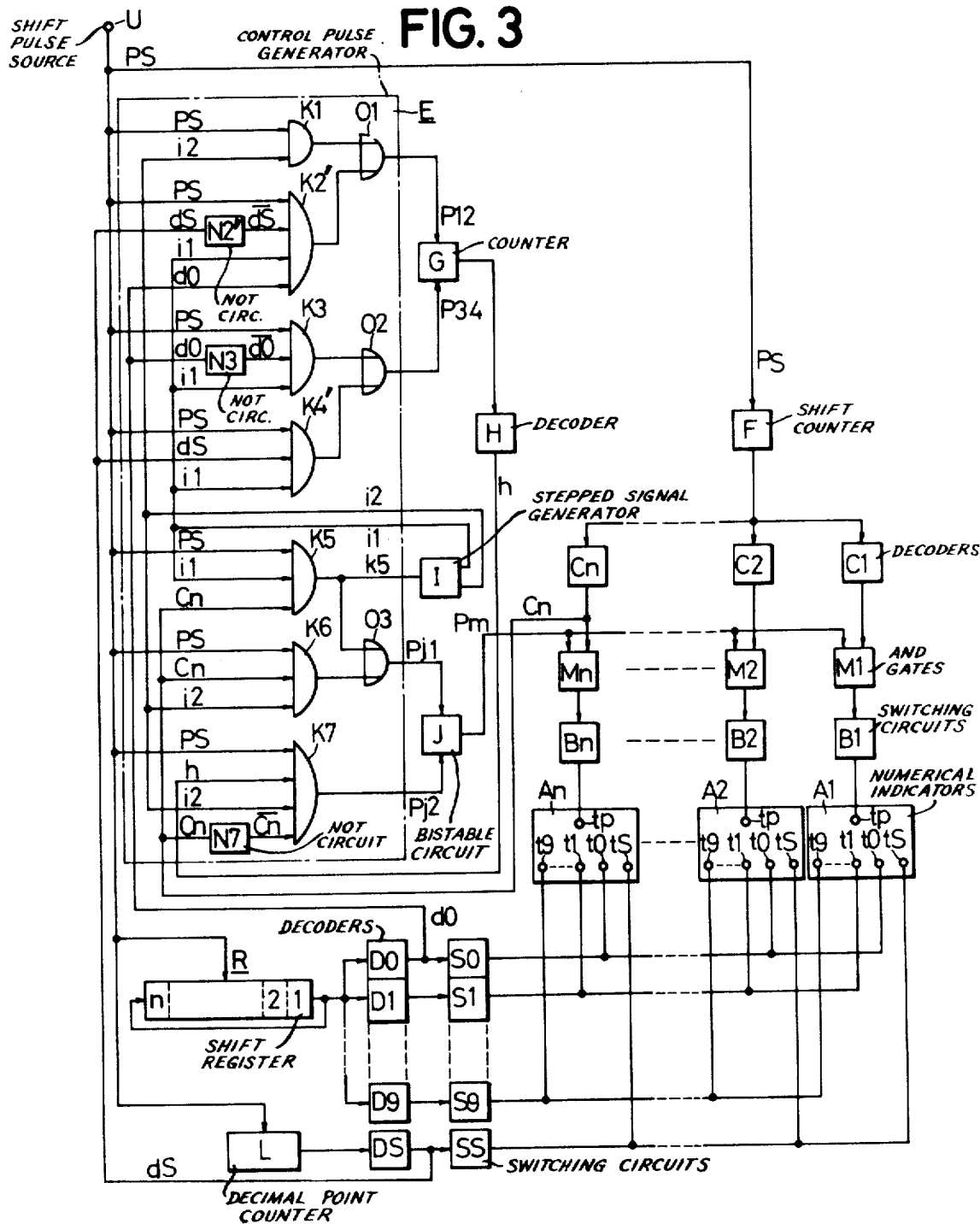
FIG. 3 is a numerical display system according to a second embodiment of this invention which is adapted for producing a numerical display with the decimal point.
Figure 4:
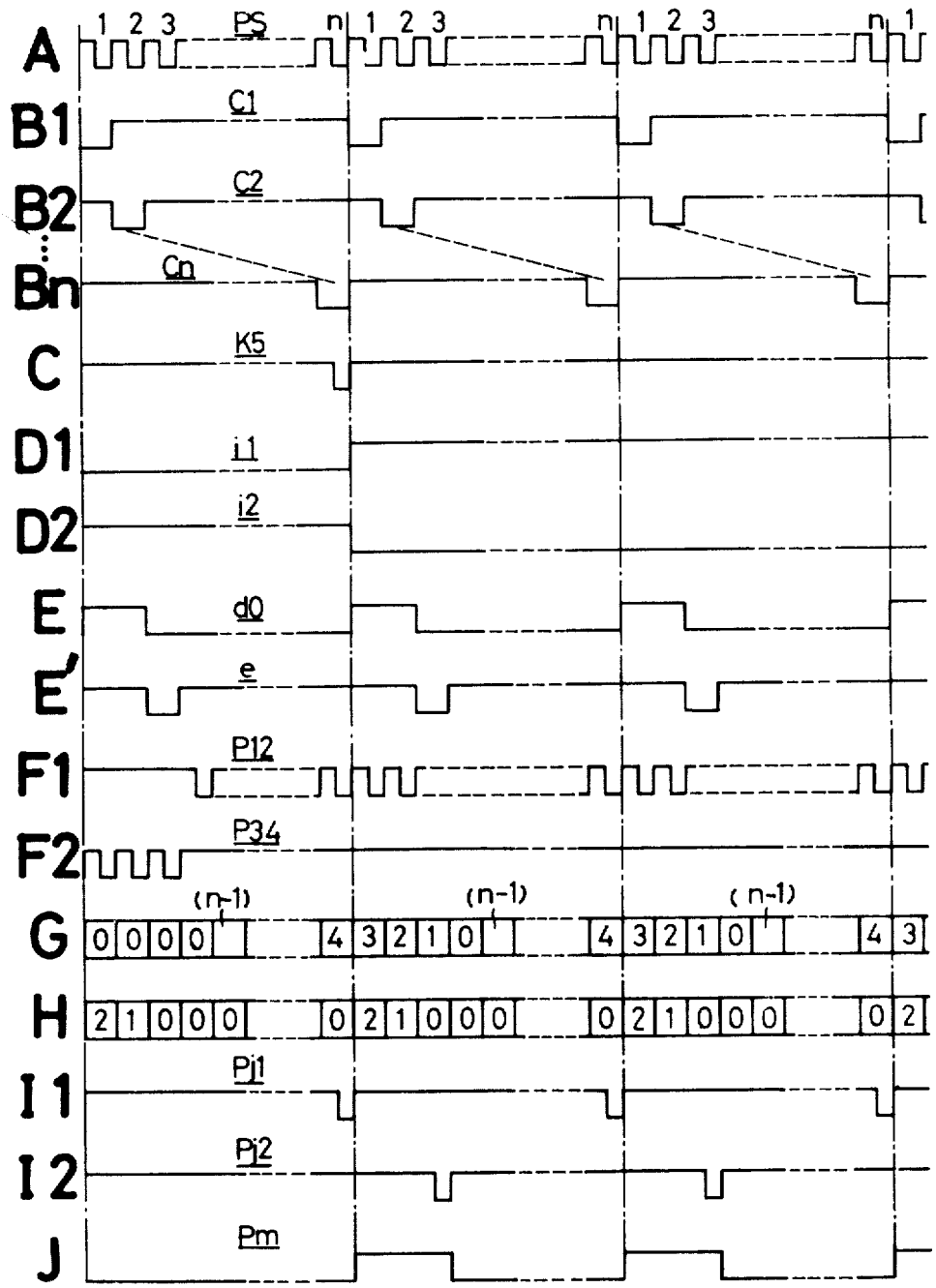
FIG 4 is a view showing a signal arrangement useful for explaining the system as shown in FIG. 3.

Referring to FIGS. 3 and 4, description will now be made of another embodiment of this invention adapted for numerical display including the decimal point.

In FIGS. 3 and 4, parts corresponding to those of FIGS. 1 and 2 are indicated by like reference numerals and symbols, and detailed description thereof will be omitted. In this embodiment, each of the indicators $A1$-$An$ includes a terminal $ts$ for indicating the decimal point. Also, there is provided a decimal-point counter L which is so designed as to produce an output when the position corresponding to that digit on which the decimal point is to be indicated is reached in synchronism with the right shift of the register R. For example, if the decimal point is to be indicated between the 3rd digit and the 2nd digit as viewed when the display is effected, then the initial contents of the decimal point counter L is 3. However, it is to be noted that the counter L is designed so that its contents is changed in such a manner as 3—2—1—$n$—in synchronism with the shift of the register R by the shift pulse train $Ps$. Description will be made of the case where the contents of the register R is 00 ...... 12 as in the foregoing example and 0.12 is displayed with the decimal point positioned between the third digit and the second digit. Assume that each indicator has the decimal point indicating portion at the right-hand side bottom. Then, the contents of the decimal point counter L is 3 since the decimal point is to be indicated on the third digit indicator. At the point of time when the register R is shifted by the shift pulse train $Ps$ so that the initial third digit contents thereof is brought to the first digit position so that it is ready to be indicated on the indicator $A3$, that is, when the contents of the counter F is 3, the contents of the decimal-point counter L is changed to 1. Thus, the counter L is caused to produce an output pulse $e$ representing the contents 1 at every one circulation of the register R, as shown in FIG. 4E'. Then, the output $e$ of the decimal counter is supplied to a decoder $Ds$ for the contents 1, and a decimal point switching circuit $Ss$ connected with the decimal point terminals $ts$ of the indicators $A1$-$An$ driven by the output of the decoder $Ds$.

Control pulse generating circuit E is partially different in the arrangement from that as shown in FIG. 1. That is, an AND circuit $K'$ corresponding to the AND circuit $K2$ of FIG. 1 is supplied with the shift pulse train $Ps$, the first stepped signal $i1$, the decoder output $d0$ and an output $ds$ (instead of the output $cl$ of FIG. 1) obtained by passing the output $ds$ of the decimal point decoder $Ds$ through NAND circuit $N2'$ corresponding to the NAND circuit $N2$. Also, AND circuit $K4'$ corresponding to the AND circuit $K4$ of FIG. 1 is supplied with the shift pulse train $Ps$, the first stepped signal $i1$ and the output $ds$ of the decimal point decoder $Ds$ (instead of the output $cl$ of FIG. 1).

The arrangement of FIG. 3 is the same as that of FIG. 1, except the minor portion. The operation of FIG. 3 will be appreciated by referring to FIG. 4 wherein parts corresponding to FIG. 2 are indicated by like symbols, and it is slightly different from that described in connection with FIG. 2 in the following respects. That is, due to the fact that the contents of the decimal point counter L enters the picture, the pulse $P12$ for successively subtracting 1 from the contents of the counter G starts with the position where the contents of the counter F becomes 4 during the first circulation of the register R, so that the number of pulses $P12$ occurring during the first circulation of the register R is reduced by one as compared with the case described above in connection with FIGS. 1 and 2. Also, the pulse $P34$ for clearing the contents of the counter G lasts from the starting position of one circulation of the register R to the position where the contents of the counter F becomes 3 as shown at F2 of FIG. 4, so that the overall number of the pulses $P34$ occurring during one circulation of the register R is increased by one as compared with the case described above with reference to FIGS. 1 and 2. Thus, when the first pulse of the pulse train $Ps$ is obtained upon initiation of the second circulation of the register R, the contents of the counter G becomes 3 as shown in FIG. 4G. Furthermore, the reset pulse $Pj2$ to be supplied to the bistable circuit J is provided by the AND circuit $K7$ at the position corresponding to the third pulse of the pulse train $Ps$ during each of the second and subsequent circulations of the register R, as shown at 12 of FIG. 412. Consequently, the rectangular wave $Pm$ provided by the bistable circuits J lasts from the start of the first pulse to the end of the third pulse of the pulse train $Ps$ in each of the second and subsequent circulations, that is, for the period covering the contents 1—2—and 3 of the counter F, as shown in FIG. 4J.

In this way, 2 is indicated on the first digit indicator $A1$, 1 on the second digit indicator $A2$, 0 on the third digit indicator $A3$, and the decimal point on the indicator $A3$. In this case, 0's are not indicated on the fourth digit and more significant digit indicators, so that the numerical display of 0.12 can be produced without indicating invalid zeros.

Although in the foregoing, description has been made of the case where 0.12 is to be displayed by way of example, it will be readily apparent to those skilled in the art that any other number containing the decimal point can be similarly displayed without indicating invalid zeros.

As described above, in accordance with this invention, common logic circuits such as switching circuits and decoders are provided with respect to the corresponding numeral indicating terminals of the indicators instead of providing separate switching circuits and decoders with respect to the individual numeral indicating terminals of the respective indicators, whereby sequential and serial numerical display can be achieved. This simplifies the entire circuit arrangement and decreases power loss correspondingly. This invention can equally be applied to the case where the register is constituted by any of delay line, magnetic core, magnetic drum, magnetic tape, etc. In case the register is composed of a delay line for example, the counter may be driven by driving pulses corresponding to the shift pulses in synchronism with the cyclic period of the contents which are successively taken out from the register. If use is made of a ring counter which operates in synchronism with the cyclic period of the register also in respect of phase, then the switching circuits $B1$- $Bn$ may be driven by the outputs which are successively available at the plural terminals of the ring counter, so that the decoders $C1$-$Cn$ can be omitted. It is to be noted that various modifications to the control pulse generating circuit E become possible. For example, although in the foregoing, description has been made of the case where 1 is subtracted from the contents of the counter G every time contents corresponding to invalid zero is taken out from the register R with the result that a pulse $Pm$ is obtained, it is also possible that use may be made of a counter which is so designed that 1 is added to the contents thereof every time contents corresponding to invalid zero is taken out from the register R with the result that such pulse $Pm$ is obtained. Furthermore, the point of time when the contents of the counter G is changed may be advanced by one shift pulse time or slightly lagged.

Furthermore, this invention has such a great advantage that since the register R is constructed as one of right shift type for the purpose of preventing invalid zeros from being indicated, it is not necessary to change the shifting direction of the register in an attempt to utilize the register of the present invention as the register for computed results of an electronic computer, in view of the fact that the register ordinarily applied to such computer possesses a right-shifting function. In addition, this invention is advantageous in that the contents of the register according to this invention can be directly utilized to effect computation in accordance therewith.

Although this invention has been described and illustrated in detail, it is to be understood that the same is by way of explanation and example only and is not taken by way of limitation, the spirit and scope of this invention being limited only by the terms of the appended claims.

We claim:

1. A numerical display system, comprising a plurality of numerical indicators for effecting plural-digit numerical display, means for producing a shift pulse train, a register the number of digit portions of which is equal to that of said numerical indicators and in which numerical contents to be displayed are stored in said digit portions and digit sequentially taken out therefrom by way of right shift by means of said shift pulse train, indicator selecting means for sequentially selecting said plurality of numerical indicators in synchronism with the right shift of said register, numeral selecting means for selecting the successive digits to be displayed by the successively selected ones of said numerical indicators in accordance with the successive numerical contents taken out from said register, and invalid zero indication preventing means coupled to said register and controlling the display of zeros by said numerical indicators for preventing the display of an invalid zero or zeros, said invalid zero indication preventing means including means for memorizing the digit position or digit positions corresponding to the digit portion or portions of stored invalid zero content or contents of said register and means for preventing activation of said numerical indicators when said stored invalid zero content or contents are taken out from said register, thereby producing a plural-digit numerical display without indicating said invalid zero or zeros.

2. A numerical display system, comprising a plurality of numerical indicators for effecting plural-digit numerical display and each having respective terminals controlling display of respective numerals, shift pulse-producing means for producing a shift pulse train, a register the number of digit portions of which is equal to that of said numerical indicators and in which numerical contents to be displayed are stored in said digit portions and digit sequentially taken out therefrom by way of right shift under the control of said shift pulse train, said shift pulse-producing means being operable to successively actuate said register to successively shift out the contents thereof to a register output, indicator selecting means for sequentially selecting said plurality of numerical indicators from that representing the least significant digit position to that representing the most significant digit position in synchronism with the right shift of said register, numeral selecting means coupled to said register output and to said numerical indicators for selecting those terminals of said plurality of numerical indicators which control the display of an identical numeral in accordance with the numerical contents sequentially taken out from said register, and invalid zero indication preventing means coupled to the register output and to said indicator selecting means for preventing the display of an invalid zero or zeros, said invalid zero indication preventing means including means for memorizing the digit position or digit positions corresponding to the digit portion or portions of stored invalid zero content or zero contents of said register during a first actuation of said register to shift out the contents thereof and means for preventing selection of the plurality of numerical indicators by said indicator selecting means when said stored invalid zero content or contents are taken out from said register during subsequent actuations of said register by said shift pulse-producing means thereby producing a plural-digit numerical display without indicating said invalid zero or zeros.

3. A numerical display system, comprising a plurality of numerical indicators for effecting plural-digit numerical display and each having respective numeral selection terminals for controlling display of respective numerals and a decimal point indicating terminal controlling display of a decimal point, shift pulse-producing means for producing a shift pulse train, a register the number of digit portions of which is equal to that of said numerical indicators and in which numerical contents to be displayed are stored in said digit portions and digit sequentially taken out therefrom by way of right shift under the control of said shift pulse train, said shift pulse-producing means being operable to successively actuate said register to successively shift out the contents thereof to a register output, a decimal-point counter driven in synchronism with the right shift of said register, indicator selecting means for sequentially selecting said plurality of numerical indicators from that representing the least significant digit position to that representing the most significant digit position in synchronism with the right shift of said register, numeral selected means for selecting those numeral selection terminals of said plurality of numerical indicators which control the display of an identical numeral in accordance with the numerical contents sequentially taken out from said register, decimal point drive means adapted to drive the decimal point indicating terminal of a selected one of said plurality of numerical indicators when the output contents of said decimal-point counter becomes a predetermined value, and invalid zero indication preventing means coupled to the register output and to said indicator selecting means for preventing the display of an invalid zero or zeros, said invalid zero indication preventing means including means for memorizing the digit position or digit positions corresponding to the digit portion or portions of stored invalid zero content or contents of said register during a first actuation of said register to shift out the contents thereof and means for preventing selection of the plurality of numerical indicators by said indicator selecting means when said stored invalid zero content or contents are taken out from said register during subsequent actuations of said register by said shift pulse producing means, thereby producing a plural-digit numerical display without said invalid zero or zeros but with the decimal point.

4. A numerical display system as set forth in claim 1, wherein: said plurality of numerical indicators are 1st, 2nd, $n$th numerical indicators each having respective numeral selection terminals for indicating the numerals 0, 1, 2, ...., 9 and a common terminal common to said numeral selection terminals; said indicator selecting means includes a counter which operates in synchronism with the right shift of said register, 1st, 2nd, ...., $n$th decoders for decoding the contents 1, 2 ...., $n$ of said counter respectively, 1st, snd, ...., $n$th AND circuits to which are supplied the outputs of said 1st, 2nd ...., $n$th decoders respectively, and 1st, 2nd, ...., $n$th switching circuits adapted to drive the common terminals of said 1st, 2nd, ...., $n$th numerical indicators under the control of the outputs said 1st, 1nd, ...., $n$th and circuits respectively; said numeral selecting means includes 0, 1, 2, ...., 9 numeral decoders for decoding the output contents 0, 1, 2, ...., 9 of said register respectively, and 0, 1, 2, ...., 9 switching circuits for driving those numeral selection terminals of said 1st, 2nd, ...., $n$ th numerical indicators which indicate the identical numerals 0, 1, 2, ...., 9 under the control of the outputs of said 0, 1, 2, .... 9 numeral decoders respecitvely; said invalid zero indication preventing means are supplied with the output of the 0 decoder of said numeral selecting means and the outputs of said 1st and $n$th decoders of said indicator selecting means to produce an output for preventing indication of invalid zero or zeros, and said invalid zero indication preventing output is supplied to the 1st, 2nd, ...., $n$th AND circuits of said indicator selecting means.

5. A numerical display system as set forth in claim 3, wherein: said plurality of numeral indicators are 1st, 2nd, ...., $n$th numerical indicators each having numeral selection terminals for indicating the numerals 0, 1, 2, ...., 9, a decimal point indicating terminal for indicating the decimal point and a common terminal common to said numeral selection and decimal point indicating terminals; said numerical indicator selecting means includes a counter which operates in synchronism with the right shift of said register, 1st, 2nd, ...., $n$th decoders for decoding the contents 1, 2, ...., $n$ of said counter respectively, 1st, 2nd, ...., $n$th AND circuits to which are supplied the outputs of said 1st, 2nd, ...., $n$th decoders respectively, and 1st, 2nd, ...., $n$th switching circuits adapted to drive the common terminals of said 1st, 2nd, ...., $n$th numerical indicators under the control of the outputs of said 1st, 2nd, ...., $n$th AND circuits respectively; said numeral selecting means includes 0, 1, 2 ...., 9 numeral decoders for decoding the output contents 0, 1, 2, ...., 9 of said register respectively, and 0, 1, 2 ...., 9 switching circuits for driving those numeral selection terminals of said 1st, 2nd, ...., $n$th numerical indicators which indicate the identical numerals 0, 1, 2 ...., 9 under the control of the outputs of said , 1, 2, ...., 9 numeral decoders respectively; said decimal point driving means includes a decimal point decoder for decoding a predetermined one of the output contents of said decimal point counter, and a switching circuit for driving the decimal point indicating terminal of one of said 1st, 2nd, ...., $n$th numerical indicators under the control of the output of said decimal point decoder; said invalid zero-indication preventing means are supplied with the output of the 0 decoder of said numeral selecting means and the output of said $n$th decoder of said indicator selecting means to produce an output for preventing indication of invalid zero or zeros, and said invalid zero indication preventing output is supplied to the 1st, 2nd, ...., $n$th AND circuits of said indicator selecting means.